Dec. 2, 1930. J. CRITES ET AL 1,783,358
AUTOMATIC TEMPERATURE CONTROL IN PULVERIZING MILLS
Filed Jan. 11, 1929 3 Sheets-Sheet 1
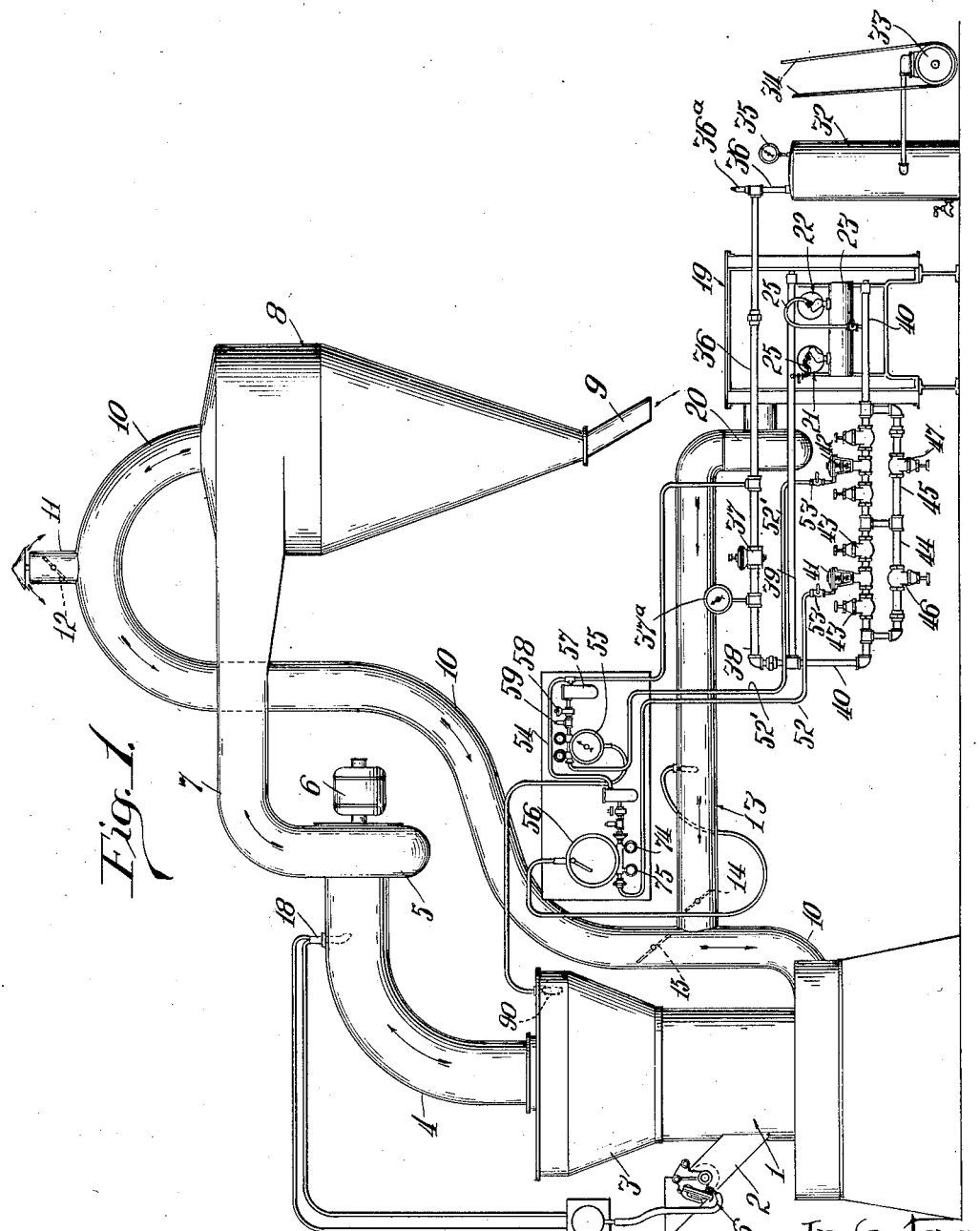

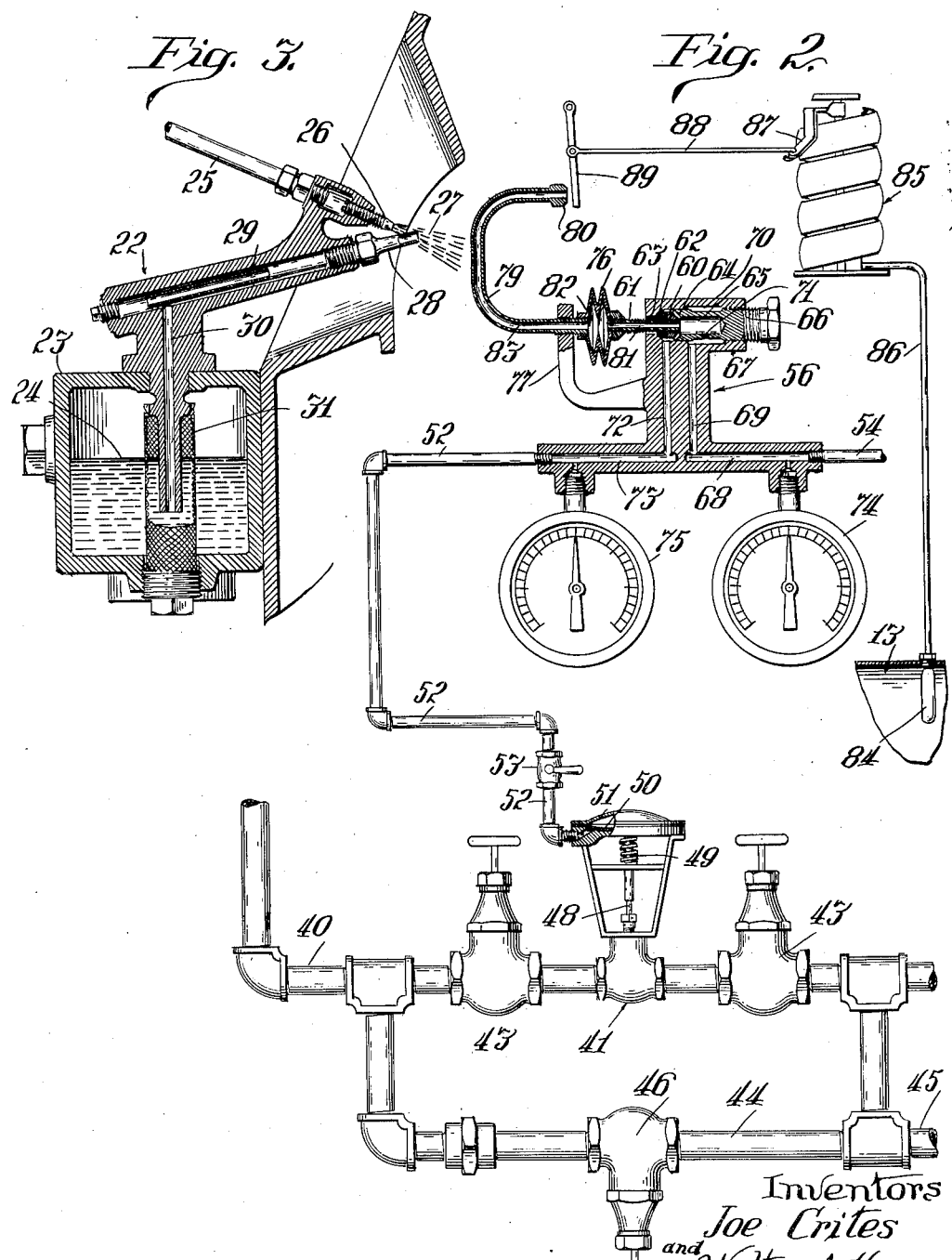

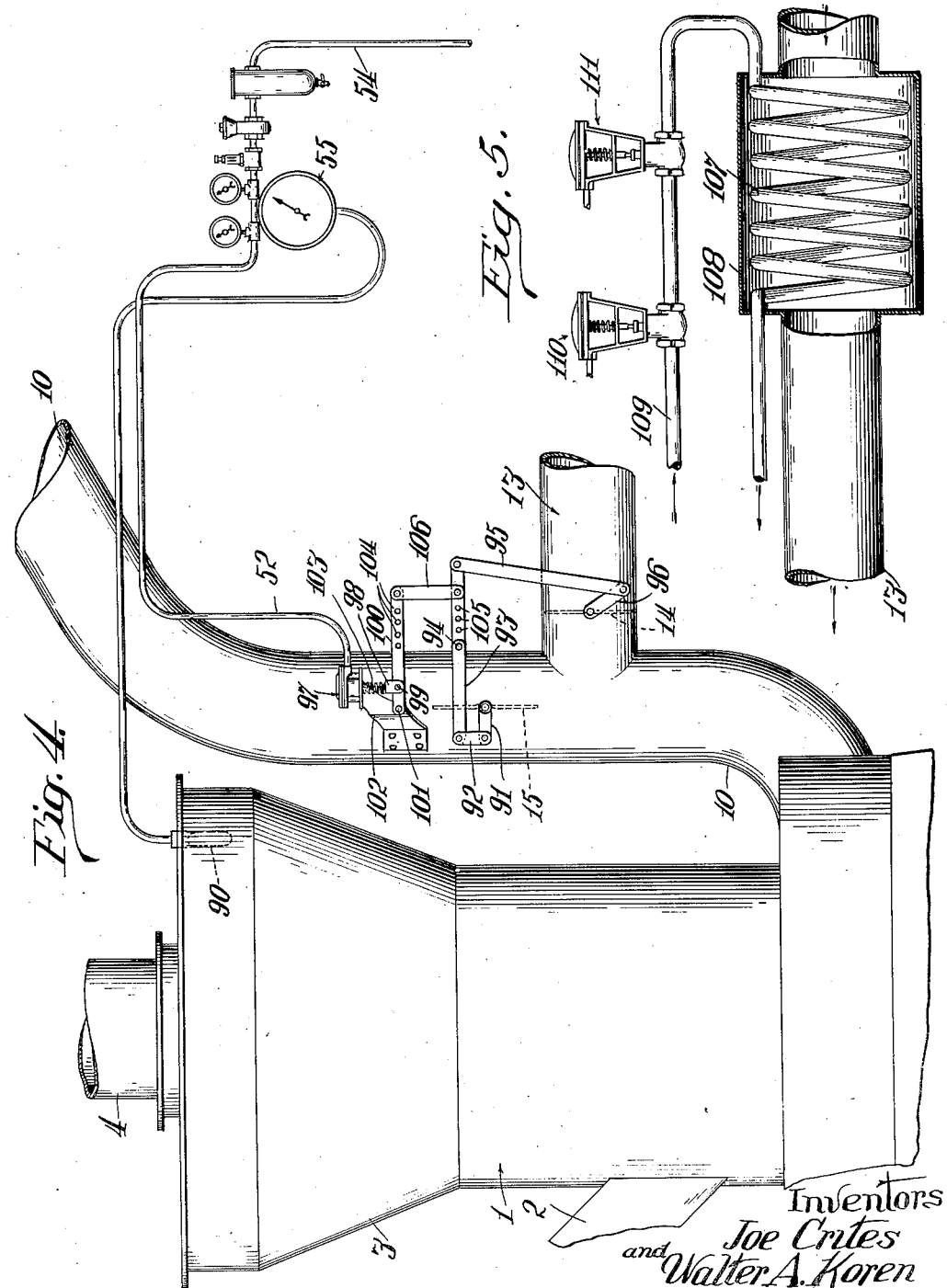

Patented Dec. 2, 1930

1,783,358

UNITED STATES PATENT OFFICE

JOE CRITES AND WALTER A. KOREN, OF EVANSTON, ILLINOIS, ASSIGNORS TO THE RAYMOND BROTHERS IMPACT PULVERIZER CO., OF CHICAGO, ILLINOIS, A CORPORATION OF ILLINOIS

AUTOMATIC TEMPERATURE CONTROL IN PULVERIZING MILLS

Application filed January 11, 1929. Serial No. 331,729.

This invention relates to an automatic temperature controlling means for pulverizing mills, and more particularly to improvements in a combined pulverizing and drying apparatus adapted for simultaneously pulverizing and removing the moisture from material, such as coal, lime, paint pigments, or similar materials.

In the type of pulverizing mill here under consideration, the pulverized material is withdrawn in suspension in a stream of air which is drawn from the mill housing by means of a suitable fan or other suction apparatus. This air stream is run into a suitable separator, where the pulverized material is deposited, and a part or all of the air stream may then be returned to the mill. If this circulating air is heated to a suitable temperature, the material may be dried to any desired extent by removing not only the surface moisture but the inherent moisture during the process of pulverization. In order to remove the surplus moisture from the air stream, and to maintain the circulating air at the proper temperature, a portion of the air stream after leaving the separator is permitted to escape and is replaced by adding a certain quantity of pre-heated dry air to the stream before it is again drawn into the mill.

The present invention relates particularly to improved means for automatically maintaining the circulating air at the desired temperature. This temperature will vary in accordance with the material that is being pulverized and may be varied by suitably adjusting the automatic temperature control mechanism. This temperature regulation may be accomplished by suitably varying the temperature of the pre-heated air that is added to the circulating air stream, or by maintaining this pre-heated air at a constant temperature and varying the relative proportions of the pre-heated air and the return air from the separator that are combined and delivered back into the mill.

The general object of this invention is to provide an improved pulverizing and drying apparatus of the type briefly described hereinabove and disclosed more in detail in the specifications which follow.

Another object is to provide, improved thermostatically controlled means for varying the heat that is applied to the incoming air in accordance with temperature changes in the mill.

Another object is to provide improved means for varying the heat that is applied to the incoming air so that a maximum temperature for this air is not exceeded.

Another object is to provide improved thermostatically controlled means for varying the proportions of the incoming dry pre-heated air and the return air from the separator that are delivered back to the mill.

Other objects and advantages of this invention will be more apparent from the following detailed description of certain approved forms of apparatus which operate according to the principles of this invention.

In the accompanying drawings:

Fig. 1 is a side elevation of one form of the apparatus.

Fig. 2 is a detail view, on a larger scale and partly in section, of one of the thermostatically controlled valve mechanisms.

Fig. 3 is a vertical section through one of the burners used in the form of the invention shown in Fig. 1.

Fig. 4 is a partial side elevation, similar to Fig. 1, of a modified form of the apparatus.

Fig. 5 is an elevation, partially in section, of a portion of another modified form of the invention.

Referring first to the form of the invention shown in Figs. 1, 2 and 3, the reference character 1 indicates the housing of a mill of either the roller or impact type, in which solid material, such as coal introduced through the feed chute 2 is pulverized. The separator 3 is directly connected with the mill and adapted to return unpulverized material to the grinding process and prevents its withdrawal through outlet conduit 4. A fan 5 driven by motor 6, or other suitable suction means, is adapted to withdraw the pulverized material in suspension in air from the mill through outlet conduit 4, and projects this suspended pulverized material through conduit 7 into the cyclone separator 8. The pulverized and dried material is withdrawn from the separator 8 through chute 9 in the usual manner. The air from which the pulverized material has been removed is drawn through return conduit 10 back into mill 1. This completes the continuous air circulation to and through the mill, this circulation being enforced by the fan 5.

An outlet 11 controlled by a damper 12 permits the escape of a regulated portion of the return air from return conduit 10. A supply conduit 13 for preheated dry air is connected with the lower portion of return conduit 10, and a damper 14 is provided in supply conduit 13, which damper is interconnected with a damper 15 in the return conduit 10. By suitably adjusting the dampers 12, 14 and 15, the amount of air permitted to escape through outlet 11, and replaced through supply conduit 13, may be adjusted as desired.

The air circulating through the mill and the continuously circulating air stream is heated to a desired temperature, and not only serves to transport the pulverized material from the mill to the cyclone separator, but also serves to remove any desired proportion of the moisture from the material during the processes of pulverization and transport to the separator. By permitting a portion of this circlating air stream to escape through outlet 11, a portion of this moisture is expelled from the system, and the dry preheated air injected through supply conduit 13 serves to keep up the temperature of the circulating air and replace heat losses. A pocketed feeder 16 in chute 2 serves to regulate the rate of introduction of solid material into the mill, and this feeder is controlled through a regulator 17 and suction conduits 18 by the degree of vacuum existing in the outlet conduit 4, so that the rate at which the material is fed will correspond with the capacity of the mill to properly handle this material. A feeder of the type here indicated is more fully disclosed in the patent to Raymond, No. 1,541,848, granted June 16, 1925.

The particular object of the present invention is to provide automatic means for maintaining a desired, and substantially fixed, temperature in the mill so that the drying operation will be properly performed. In the example of the invention shown in Fig. 1, the temperature of the incoming dry air is raised in the heater indicated at 19, and projected from this heater by means of fan 20 through supply conduit 13 and thence into the return conduit 10. Heat is supplied to heater 19 by means of a pair of similar oil burners 21 and 22 of the type indicated in Fig. 3. These burners embody a reservoir 23 in which a supply of oil 24 is maintained at a substantially constant level by suitable oil feed mechanism, not here disclosed. Compressed air furnished through the air line pipe 25 and discharged through nozzle 26 in a stream 27 which envelopes the oil discharge tip 28, serves to create a suction in the oil passages 29 and 30, whereby oil is drawn through strainer 31 from the oil supply 24. The amount of oil withdrawn and the intensity of the flame at 27 will be governed by the air pressure, and when the air supply is entirely cut off the oil flow will cease and the burner will be extinguished.

The compressed air supply is maintained in air tank 32 by means of a compressor 33 driven through belt 34 from any suitable source of power, such as one of the fan shafts. Tank 32 is provided with a gauge 35, and the outlet pipe 36 has a safety valve 36a. Outlet pipe 36 leads to a line pressure reducer 37 from which leads the low pressure pipe 38 provided with gauge 37a. Pipe 38 is provided with two branches 39 and 40 adapted to deliver air respectively to the air lines 25 of the two burners 21 and 22. In the example here shown, the burner 21 operates continuously, whereas burner 22 is turned off and on automatically to regulate the amount of heat delivered to the heater 19.

In order to control the flow of air to burner 22, the supply pipe 40 is provided with a pair of thermostatically controlled cut-off valves 41 and 42. These valves may be of similar construction, as hereinafter described, and are separately operated. Manually operated cut-off valves 43 are provided at each side of the respective automatic control valves 41 and 42, and bypass lines 44 and 45 extending around the respective control valves and controlled by cut-off valves 46 and 47 provide means whereby either one or both of the automatic valves may be thrown out of service. Each of the valves 41 and 42 (see Fig. 2) is provided with a valve stem 48, and a spring 49 to force down valve stem 48 and close the valve, thus cutting off the flow of air through pipe 40. A diaphragm 50 connected with the upper end of stem 48 is housed within a casing 51, and if compressed air is admitted through pipe 52, controlled by cut off valve 53, to the space beneath diaphragm 50, the valve stem will be lifted and the valve held open. Air flows from high pressure air line 36 through air line 54, thermostatically operated temperature controllers 55 and 56, and air lines 52 and 52' to the respective valves 41 and 42, whereby these valves are held open against the force of springs 49.

As here shown, the controller 55 is a non-recording temperature controller, whereas the controller 56 is a recording temperature controller, but the temperature control mechanism in each is substantially the same as far as the present invention is concerned and a description of one will suffice for both. The air is admitted to either through a moisture trap 57, a reducing valve 58, and a safety valve 59. Referring now to the upper portion of Fig. 2, the operating principle of one of these controllers is illustrated somewhat in detail. The double valve member 60 provided with hollow valve stem 61 is movable laterally between a fixed valve seat 62 controlling the outlet port 63, and a movable valve seat 64 at the open end of chamber 65 formed in the threaded member 66 adjustable laterally in the casing 67. By screwing the member 66 in or out, the distance between valve seats 62 and 64 may be varied. The inlet pipe 54 connects with the passages 68 and 69 in casing 67 which lead to an annular chamber 70 surrounding a portion of member 66 and connected through port 71 with the chamber 65. When valve 60 is in the position shown in Fig. 2, the air under pressure in chamber 65 can flow around the valve member 60 and through passages 72 and 73 in the casing 67 to the pipe line 52 leading to the control valve 41. The valve 60 being seated against fixed valve seat 62 will close the outlet port 63 and prevent escape of air pressure at this point. The pressure gauges 74 and 75 serve to indicate the pressure in the pipe lines 54 and 52, respectively. The valve stem 61 is connected with the movable side of a bellows diaphragm 76 which is mounted at its other side in a fixed bracket arm 77 extending from the casing 67. The small passage 81 in valve stem 61 connects with space 82 in diaphragm 76 and thence through the small passage 83 in conduit 79 with the open nozzle 80, whereby there is a continuous small leakage of air from chamber 65 through these passages and the open nozzle 80. A bulb 84 and a helical tube 85 connected by tubing 86 contain a fluid which vaporizes or expands in accordance with variations in temperature. The lower end of helical tube 85 is mounted on a fixed support, and the free upper end carries a crank arm 87 connected by link 88 with a flap valve 89 adapted to close the nozzle 80. The bulb 84 is positioned in the supply pipe or conduit 13, whereby it will respond to the temperature of the pre-heated air flowing through this conduit.

As the temperature in conduit 13 rises, the fluid in the bulb 84 and helical tube 85 will expand so that the tube 85 will tend to uncoil and move the crank arm 87, and the mechanism is so adjusted that at a predetermined temperature in the conduit 13 the flap valve 89 will be moved so as to cut off the flow of air through nozzle 80. This will cause the pressure to build up in the chamber 82 in diaphragm 76, and since this diaphragm can expand in only one direction (that is toward the right in Fig. 2) the valve 60 will be moved away from the fixed valve seat 62 and into engagement with the adjustable valve seat 64. This will cut off the flow of air from chamber 65, and the air line 72, 73 and 52 will be opened to the atmosphere through port 63 so that the air pressure will be dissipated beneath the diaphragm 50 of the control valve 41, which will be closed by the expansion of spring 49. This will cut off the flow of air through air line 40 to the burner 22, which will be extinguished. When the temperature has fallen sufficiently in the conduit 13, the valve 41 will again be opened by an obvious reversal of the processes just described hereinabove.

The controller 55 operates the same as the controller 56, just described, except for the fact that the bulb 90 is positioned in the mill 1 or in the separator 3 so that the cut-off valve 42 will be operated in response to temperature changes in the mill. It will be apparent that (providing the by-passes 44 and 45 are closed) the burner 22 can only operate when both control valves 41 and 42 are open.

The temperatures at which the respective controllers 55 and 56 will be set to operate will vary with the material that is being treated in the mill 1. If coal is being pulverized, it is not necessary that all of the moisture be removed, and a temperature of between 110° and 120° Fahrenheit is desirable in the mill. It is also necessary that a maximum temperature of from 350° to 375° Fahrenheit be not exceeded in the supply pipe 13, since the introduction of more highly heated air might cause the ignition of the coal. Accordingly, the controller 55 will be set to close the valve 42 when a temperature of, for example, 120° Fahrenheit has been reached in the mill, and the controller 56 will be set to operate to close the valve 41 when a temperature of, for example, 375° F. has been reached in the supply pipe 13. If either temperature is exceeded, one or the other of the valves 41 and 42 will be closed so as to cut off the flow of air to burner 22, thus temporarily putting this burner out of service. This will cause a decrease in the temperature of the air supplied through conduit 13 until the excess temperature condition has been corrected, whereupon the valves 41 or 42 or both will be automatically opened and the burner 22 returned to service.

When some materials, such as paint pigments, are being pulverized, it is desirable that all of the moisture be removed and a higher temperature is maintained in the mill, for example, from 170° to 180° Fahrenheit. If the material is non-combustible or not readily combustible, a higher temperature may be maintained in the supply pipe 13, but the controller 56 will be set to operate at some temperature, such as 700° Fahrenheit, which, if exceeded, would be apt to burn out or injure the piping or other apparatus. If the controllers 55 and 56, and the dampers 12, 14 and 15, are properly adjusted in accordance with the material that is being pulverized, the mill temperature will be automatically controlled to maintain the proper drying conditions at all times.

In Fig. 4 we have illustrated a modified form of the invention, in which the preheated hot air supplied through conduit 13 is of a constant or uniform temperature, and the temperature in the mill is adjusted by varying the proportions of this hot air introduced with respect to the proportion of air from the separator 8 that is returned through conduit 10. The valve or damper 15 in return conduit 10 is connected by means of a crank arm 91 and link 92 with one end of a lever 93 intermediately pivoted at 94 at one side of the conduit. The other end of lever 93 is connected through link 95 and crank arm 96 with the damper or valve 14 in the supply conduit 13. These connections are so positioned that when the valve 15 is fully opened, the valve 14 will be fully closed (as shown in the drawings), and on the other hand as valve 15 is moved to a closed position, the valve 14 will be correspondingly opened. At 97 is shown a pressure-operated diaphragm motor of the type indicated at 50 in Fig. 2, this motor being connected through pipe line 52 with the controller 55, which has its bulb 90 positioned in the mill, as in the first described form of the invention. The stem 98 extending from the diaphragm of the motor is pivoted at its lower end 99 to a lever 100 fulcrumed at 101 on the bracket 102 which supports the motor 97. The pressure operated diaphragm tends to lift the stem 98 and lever 100 in opposition to the force of spring 103. The movable end portion of lever 100 is provided with a plurality of openings 104, and the outer arm of lever 93 is provided with a plurality of similarly spaced openings 105, and the two levers are adapted to be connected by a link 106 pivoted at its respective ends in a selected pair of openings 104 and 105. By suitably adjusting the position of the link 106, the movement that is imparted to the valves 14 and 15 by the operation of diaphragm motor 97 may be varied as desired. With the parts in the position shown in the drawings, the desired temperature has been exceeded in the mill and controller 55 has operated to cut off the air supply through line 52, and spring 103 has expanded to open valve 15 and close valve 14 so that the supply of additional hot air through conduit 13 is completely cut off. When the temperature has fallen in the mill, the controller 55 will operate to restore air pressure to the motor 97, whereupon the valves or dampers 14 and 15 will be rotated to permit a desired quantity of hot air to flow into the circulating system from conduit 13 and to restrict the flow of return air through conduit 10, the excess air passing out through the outlet 11 controlled by damper 12.

In Fig. 5 is indicated another method for varying the temperature of the additional hot air supplied through conduit 13. A steam coil 107 is positioned in a casing 108 interposed in the conduit 13 so that the air drawn through this casing will be heated before being introduced into the return conduit 10. The steam supply pipe 109 is provided with automatically controlled valves 110 and 111 corresponding to the valves 41 and 42 in the first described modification and similarly controlled and operated. If desired, a pair of steam coils, one of which is continuously on and the other of which is automatically controlled, similarly to the burners 21 and 22 of Fig. 1, may be utilized instead of the single coil 107. By-passes and other control valves, such as shown in Fig. 1, can also be utilized in this form of the invention, but have been omitted from Fig. 5 in order to simplify the disclosure. If the steam coil or coils are so designed that a maximum heat in supply conduit 13 cannot be exceeded, only one control valve, and the single controller 55 operated from the mill, need be used.

We claim:

1. In a pulverizing and drying apparatus, a pulverizing mill including means for feeding thereinto material to be pulverized, means for continuously circulating a stream of heated air into, through and back to the mill, means for adding preheated air to the circulating stream, and means responsive to the temperature in the mill for adjusting the temperature of the preheated air.

2. In a pulverizing and drying apparatus, a pulverizing mill including means for feeding thereinto material to be pulverized, means for continuously circulating a stream of heated air into, through and back to the mill, means for adding preheated air to the circulating stream, and means resposive to the temperature in the mill for varying the quantity of preheated air that is introduced into the circulating air stream.

3. In a pulverizing and drying apparatus, a pulverizing mill including means for feeding thereinto material to be pulverized, means for circulating heated air through the mill, means for furnishing additional heat to the circulating air, and means responsive to the temperature in the mill for controlling the heat adding means.

4. In a pulverizing and drying apparatus, a pulverizing mill including means for feeding thereinto material to be pulverized, means for circulating heated air through the mill, means for introducing preheated air into the circulating air, and means responsive to the temperature in the mill for varying the amount of preheated air added.

5. In a pulverizing and drying apparatus, a pulverizing mill including means for feeding thereinto material to be pulverized, means for circulating heated air through the mill, an air heating means, means for introducing air from the heating means into the circulating air system, and means responsive to the temperature in the mill for controlling the heating means.

6. In a pulverizing and drying apparatus, a pulverizing mill including means for feeding thereinto material to be pulverized, means for circulating heated air through the mill, an air heating means, means including a conduit for injecting air from the heating means into the circulating air system, and means responsive to both the temperature in the mill and the temperature of the air in the conduit for controlling the heating means.

7. In a pulverizing and drying apparatus, a pulverizing mill including means for feeding thereinto material to be pulverized, means for circulating heated air through the mill, an air heating means, including a delivery pipe for supplying an operating fluid to the heater, a valve in this pipe, and means responsive to the temperature in the mill for closing or opening this valve.

8. In a pulverizing and drying apparatus, a pulverizing mill including means for feeding thereinto material to be pulverized, means for circulating heated air through the mill, an air heating means, including a delivery pipe for supplying an operative fluid to the heater, means including a conduit for injecting air from the heating means into the circulating air system, a pair of separate valves in the delivery pipe, means responsive to the temperature in the mill for operating one of these valves, and means responsive to the temperature in the conduit for controlling the other valve.

9. In a pulverizing and drying apparatus, a pulverizing mill including means for feeding thereinto material to be pulvarized, means for ciruclating heated air through the mill, an air heating means, including a delivery pipe for supplying an operating fluid to the heater, means including a conduit for injecting air from the heating means into the circulating air system, valve means for controlling the flow of fluid through the delivery pipe, and means responsive to both the temperature in the mill and the temperature of the air in the conduit for controlling the valve means.

10. In a pulverizing and drying apparatus, a pulverizing mill including means for feeding thereinto material to be pulverized, means for circulating heated air through the mill including a conduit for withdrawing air and pulverized material suspended therein from the mill, a separator for removing the pulverized material, and a return conduit for returning a portion of the air to the mill, a supply conduit leading into the return conduit for delivering preheated air to the system, and means responsive to the temperature in the mill for controlling the heat put into the system.

11. In a pulverizing and drying apparatus, a pulverizing mill including means for feeding thereinto material to be pulverized, means for circulating heated air through the mill including a conduit for withdrawing air and pulverized material suspended therein from the mill, a separator for removing the pulverized material, and a return conduit for returning a portion of the air to the mill, a supply conduit leading into the return conduit, means including a heater for delivering preheated air to the supply conduit, and means responsive to the temperature in the mill for controlling the heater.

12. In a pulverizing and drying apparatus, a pulverizing mill including means for feeding thereinto material to be pulverized, means for circulating heated air through the mill including a conduit for withdrawing air and pulverized material suspended therein from the mill, a separator for removing the pulverized material, and a return conduit for returning a portion of the air to the mill, a supply conduit leading into the return conduit for delivering preheated air to the system, and means responsive to the temperature in the mill for varying the amount of preheated air added.

13. In a pulverizing and drying apparatus, a pulverizing mill including means for feeding thereinto material to be pulverized, means for circulating heated air through the mill including a conduit for withdrawing air and pulverized material suspended therein from the mill, a separator for removing the pulverized material, and a return conduit for returning a portion of the air to the mill, a supply conduit leading into the return conduit for delivering preheated air to the system, a damper in the return conduit, a damper in the supply conduit, means interconnecting the dampers so that one will be opened as the other is closed, and means responsive to the temperature in the mill for removing the dampers.

14. In a pulverizing and drying apparatus, a pulverizing mill including means for feeding thereinto material to be pulverized, means for circulating heated air through the mill including a conduit for withdrawing air and pulverized material suspended therein from the mill, a separator for removing the pulverized material, and a return conduit for returning a portion of the air to the mill, a supply conduit leading into the return conduit for delivering preheated air to the system, a damper in the return conduit, a damper in the supply conduit, means interconnecting the dampers so that one will be opened as the other is closed, a fluid-pressure motor for operating the dampers, and a thermostat in the mill for controlling the flow of pressure fluid to the motor.

15. In a pulverizing and drying apparatus, a pulverizing mill including means for feeding thereinto material to be pulverized, means for circulating heated air through the mill including a conduit for withdrawing air and pulverized material suspended therein from the mill, a separator for removing the pulverized material, and a return conduit for returning a portion of the air to the mill, a supply conduit leading into the return conduit means including a heater for delivering pre-heated air to the supply conduit, and means responsive to both the temperature in the mill and the temperature in the supply conduit for controlling the heater.

16. In a pulverizing and drying apparatus, a pulverizing mill including means for feeding thereinto material to be pulverized, means for circulating heated air through the mill including a conduit for withdrawing air and pulverized material suspended therein from the mill, a separator for removing the pulverized material, and a return conduit for returning a portion of the air to the mill, a supply conduit leading into the return conduit, means including a heater for delivering preheated air to the supply conduit, the heater including a delivery pipe for supplying an operating fluid thereto, a valve in this pipe, and valve-operating means responsive to the temperature in the mill.

17. In a pulverizing and drying apparatus, a pulverizing mill including means for feeding thereinto material to be pulverized, means for circulating heated air through the mill including a conduit for withdrawing air and pulverized material suspended therein from the mill, a separator for removing the pulverized material, and a return conduit for returning a portion of the air to the mill, a supply conduit leading into the return conduit, means including a heater for delivering preheated air to the supply conduit, the heater including a delivery pipe for supplying an operating fluid thereto, a pair of separate valves in this pipe, means responsive to the temperature in the mill for operating one valve, and means responsive to the temperature in the supply pipe for operating the other valve.

18. In a pulverizing and drying apparatus, a pulverizing mill including means for feeding thereinto material to be pulverized, means for circulating heated air through the mill including a conduit for withdrawing air and pulverized material suspended therein from the mill, a separator for removing the pulverized material, and a return conduit for returning a portion of the air to the mill, a supply conduit leading into the return conduit, means including a heater for delivering preheated air to the supply conduit, the heater including a delivery pipe for supplying an operating fluid thereto, valve means for controlling the flow of fluid through the delivery pipe, and means responsive to both the temperature in the mill and the temperature in the supply pipe for operating the valve means.

19. In a pulverizing and drying apparatus, a pulverizing mill including means for feeding material thereinto to be pulverized, a separator, means including a conduit and a fan therein for withdrawing pulverized material from the air in suspension in heated air and delivering same to the separator, a return conduit for delivering a part of the heated air back from the separator to the mill, a supply conduit leading into the return conduit, an air heater, a fan for propelling heated air from the heater through the supply conduit into the return conduit, a burner for the heater comprising a fuel feeding device controlled by compressed air, a source of compressed air, a pipe for delivering air from the source to the burner, a pair of cut-off valves in the delivery pipe, a pressure-operated diaphragm motor for controlling each valve, a pressure pipe line for supplying air from the source to each motor, a thermostatically operated valve in each pressure pipe line, one of these valves being responsive to the temperature in the mill and the other being responsive to the temperature of the pre-heated air in the supply pipe.

20. In a pulverizing and drying apparatus, a pulverizing mill including means for feeding material thereinto to be pulverized, a separator, means including a conduit and a fan therein for withdrawing pulverized material from the air in suspension in heated air and delivering same to the separator, a return conduit for delivering a part of the heated air back from the separator to the mill, a supply conduit leading into the return conduit, an air heater, a fan for propelling heated air from the heater through the supply conduit into the return conduit, a burner for the heater comprising a fuel-feeding device controlled by compressed air, a source of compressed air, a pipe for delivering air from the source to the burner, a pair of cut-off valves in the delivery pipe, a pressure-operated diaphragm motor for controlling each valve, a pressure pipe line for supplying air from the source to each motor, a thermostatically operated valve in each pressure pipe line, one of these valves being responsive to the temperature in the mill and the other being responsive to the temperature of the preheated air in the supply pipe, an outlet in the return conduit, and dampers in the outlet, the return conduit and the supply conduit, whereby the percentage of preheated air added to the circulating system may be varied.

21. In a fuel preparing and handling system, the combination of a pulverizer mill, separator means, a delivery line from the mill to the separator means, a return line from the separator means to the mill, means for setting up an air current in the system, means for introducing heat into the system, means for controlling the amount of heat introduced, and means responsive to changes in temperature in the system for automatically regulating said control means to admit more heat when the temperature in the system falls below a predetermined value and to admit less heat when the temperature rises above said predetermined value.

22. In a fuel preparing and handling system, the combination of a pulverizer mill, separator means, a delivery line from the mill to the separator means, a return line from the separator means to the mill, means for setting up an air current in the system, means for introducing heat into the system, and means for maintaining a predetermined temperature in the system including a thermostat subject to heat in the system, and means operated by the thermostat to control the introduction of the heat into the system.

23. In a fuel preparing and handling system, the combination of a pulverizer mill, separator means, a delivery line from the mill to the separator means, a return line from the separator means to the mill, means for setting up an air current in the system, means for introducing heat into the system, and means for maintaining a predetermined temperature in the system including a thermostat subject to heat in the system, a damper controlling the admission of heat into the system, means for operating said damper, and means operated by the thermostat for controlling the operation of said damper operating means.

JOE CRITES.
WALTER A. KOREN.